US010530905B1

(12) United States Patent
Rey et al.

(10) Patent No.: US 10,530,905 B1
(45) Date of Patent: Jan. 7, 2020

(54) FRAME DELIMITER DETECTION

(71) Applicant: NXP USA, Inc., Austin, TX (US)

(72) Inventors: Claudio Gustavo Rey, Chandler, AZ (US); Samuel Becqué, Denderleeuw (BE); Raja Venkatesh Tamma, Leander, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/378,052

(22) Filed: Apr. 8, 2019

(51) Int. Cl.
 *H04L 7/06* (2006.01)
 *H04L 29/06* (2006.01)
 *H04L 27/14* (2006.01)
 *H04B 1/16* (2006.01)
 *H04L 29/08* (2006.01)

(52) U.S. Cl.
 CPC ............. *H04L 69/22* (2013.01); *H04B 1/16* (2013.01); *H04L 27/14* (2013.01); *H04L 67/12* (2013.01)

(58) Field of Classification Search
 CPC ......... H04L 7/042; H04L 7/044; H04L 7/041; H04B 1/70735
 See application file for complete search history.

(56) References Cited

U.S. PATENT DOCUMENTS

| 5,506,865 A * | 4/1996 | Weaver, Jr. ............. G06F 17/15 370/335 |
| 6,304,563 B1 * | 10/2001 | Blessent ............... H04B 1/7113 370/335 |
| 7,751,502 B2 | 7/2010 | Kwak et al. |
| 9,479,288 B2 | 10/2016 | Waheed et al. |
| 9,729,195 B2 | 8/2017 | Tamma et al. |
| 9,853,787 B2 | 12/2017 | Stanciu et al. |
| 2004/0264592 A1 * | 12/2004 | Sibecas .................. H01Q 21/24 375/267 |
| 2017/0294972 A1 * | 10/2017 | Rohde .................... H04B 10/63 |

* cited by examiner

*Primary Examiner* — Kevin Kim

(57) ABSTRACT

A frame delimiter detection system and method includes a phase differentiator and buffering module, a phase-to-I/Q reformatting module, a dot product module, an I/Q-to-polar reformatting module, a dot product comparison module, and a frame delimiter detection module. The method may include receiving in-phase and quadrature-phase (I/Q) formatted frequency domain input samples configured as a frame delimiter in a communication packet. An I/Q formatted dot product may be generated from the I/Q formatted frequency domain input samples and a reference pattern indicative of an expected frame delimiter. Further, a frame delimiter detection signal may be generated based on a magnitude of the I/Q formatted dot product.

20 Claims, 9 Drawing Sheets

FRAME DELIMITER DETECTION

TECHNICAL FIELD

This disclosure relates generally to frame detection, and more specifically to frame delimiter detection of frequency shift keying (FSK) signals.

BACKGROUND OF THE DISCLOSURE

Deployment of Internet of Things (IoT) relies on networks of low-cost wireless devices that work reliably in the presence of interference. IoT standards include, for example, IEEE standard 802.15.4 (used by low power energy Bluetooth (BLE), Zigbee, and Thread standards). These standards use pseudo noise (PN) coding sequences over O-QPSK (offset quadrature phase shift keying. While a preamble may be used for symbol timing and frequency acquisition, the frame delimiter needs to be detected separately. Because noisy signals may create false detections, techniques that are more robust to noisy environments are important.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

It should be understood that the figures are merely schematic and are not drawn to scale. It should also be understood that the same reference numerals may be used throughout the figures to indicate the same or similar parts.

DETAILED DESCRIPTION

Figure 1:
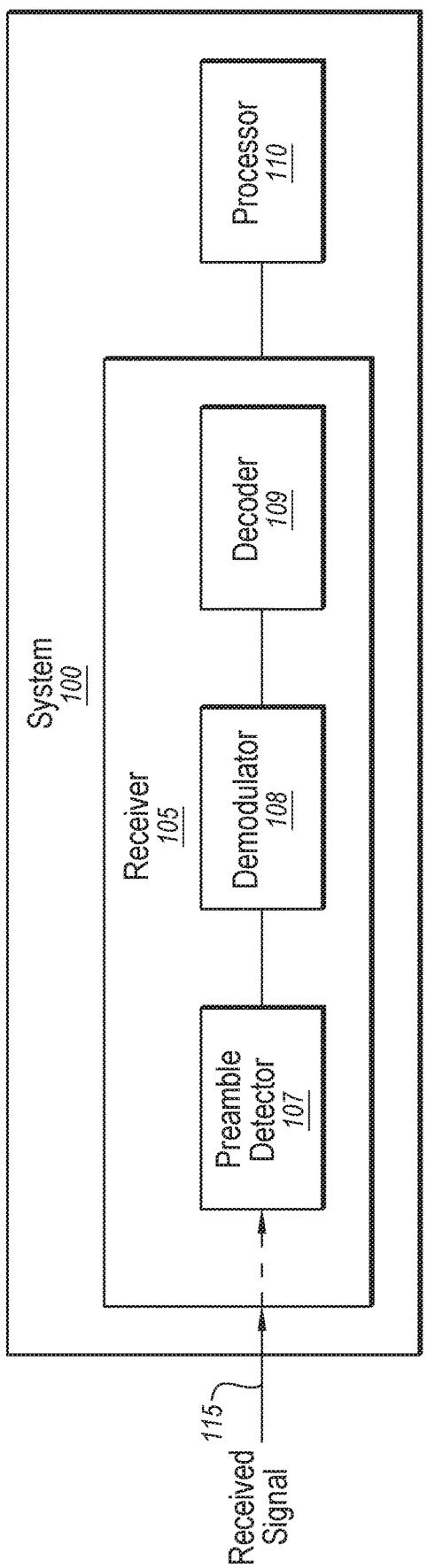
FIG. 1 illustrates a communication system for receiving digital data, in accordance with embodiments described herein.

According to various embodiments, a method and apparatus for frame synch delimiter detection for MSK/(G)FSK signals that is flexible in terms of handling very large modulation indexes and very long preamble sequences while keeping complexity low is disclosed. The search for the frame delimiter determines the beginning of the data payload resulting in the identification of frame timing for the incoming packet. The method is based on conversion from the FM domain to the I/Q domain and has an extension to handle modulations with large modulation indexes, e.g., larger than 2.5. The method may utilize passing an input power threshold and measuring a Hamming distance of the received synch pattern as compared to the expected synch pattern(s) if the incoming signal level is sufficiently high. The disclosed embodiments also have the capability of fractional timing estimation and frequency offset estimation.

In a communication transmission, information may be communicated using a packet comprised of a preamble, a frame delimiter, a header, and payload data. In some embodiments, the preamble may be used for symbol timing and frequency acquisition but the Frame Delimiter needs to be separately detected. In other embodiments, the preamble search only establishes a possible detection and frame timing, symbol timing and frequency acquisition are all estimated in the Frame-Synch-Delimiter search algorithm. The frame delimiter, for short, indicates the beginning of the physical header and marks the beginning of the information in the packet. If a previous preamble search has already established symbol timing, then the frame delimiter detector (FDD) may save power as the search for the delimiter is then restricted to symbol locations. Alternatively, the FDD may operate independently of the preamble detector, if the preamble is very short as may be the case, for example, with low energy Bluetooth (BLE).

In the disclosed embodiments, the frame delimiter deteciton is performed in an FM domain and then converted back into the I/Q domain. Further techniques, such as signal level detection to avoid triggering on false pulses may also be included.

Various improvements are noted with the use of the disclosed frame delimiter detection techniques. Specifically, the disclosed frame delimiter detection provides resistance to frequency deviation and, in particular, to carrier frequency offset (CFO). Further, the disclosed frame delimiter detection techniques facilitate the joint computation of carrier frequency offset (CFO) and fractional timing estimation, without requiring a plurality of searches or precomputation of the frequency offset. Yet further, the disclosed frame delimiter detection techniques are resistant to falsing on noise by gating the start frame delimiter (SFD) with an input signal power threshold.

Further improvements include reduction of falsing on noise by checking FM demodulation bits against the frame delimiter bits. The SFD correlator phase in the disclosed method estimates the CFO and may be used to remove bias to the FM estimate form frequency offsets. Further, the disclosed frame delimiter detection techniques support both large and small FM deviations.

It should be appreciated that the disclosed techniques may be employed with various modulation schemes (e.g., phase-shift keying (PSK) modulation schemes, frequency shift keying (FSK) and their variations). Advantageously, the disclosed techniques tend to reduce packet loss and, as such, reduce re-transmissions, reduce required transmission power, and increase throughput and coverage. The disclosed techniques may be implemented in hardware (e.g., in an application specific integrated circuit (ASIC) or a field-programmable gate array (FPGA)) or using a combination of hardware and software (e.g., using a programmed general purpose processor or a programmed digital signal processor (DSP)). It should also be appreciated that the disclosed techniques are not limited to FSK demodulation. In general, the disclosed techniques are broadly applicable to time domain synchronization using repeated preamble samples. The disclosed techniques are also applicable to various modulations techniques, e.g., FSK, GFSK, MSK, GMSK and/or O-QPSK/DSSS modulation techniques.

A method for frame delimiter detection is disclosed. The method may include receiving a communication packet including phase domain input samples including a frame delimiter. The phase domain input samples correspond to the frame delimiter and may be converted into frequency domain input samples The frequency domain input samples may then be reformatted into in-phase and quadrature phase (I/Q) formatted frequency domain input samples. A dot product process may be performed between the I/Q formatted frequency domain input samples and a reference pattern in samples indicative of an expected frame delimiter. The dot product process generates an I/Q formatted dot product. The I/Q formatted dot product may be reformatted into a polar formatted dot product including a magnitude of the polar formatted dot product and an angle of the polar formatted dot product. When the magnitude of the dot product exceeds a threshold, then the received pattern is quite likely to be the frame delimiter pattern and a possible synch detection has occurred. A frame delimiter detection signal may then be generated based on this event.

The generating the frame delimiter detection signal may further include identifying a peak in the magnitude of the polar formatted dot product, generating a peak-found signal in response to the identifying the peak, and generating the frame delimiter detection signal based in part on the peak-found signal. The frame delimiter detection signal logic may also further include asserting an input power sufficient signal based on a comparison of a power level of the phase domain input samples with a low minimum power threshold.

The generating the frame delimiter detection signal may further include generating a Hamming check match signal based on a Hamming check between the frequency-domain input samples and a reference pattern. When the Hamming check match signal indicates passing the Hamming check, generating the frame delimiter detection signal based in part on the Hamming check match signal. The Hamming check may further include adjusting an offset of the frequency domain input samples based on the angle of the polar formatted dot product, and performing the Hamming check based on the frequency domain input samples adjusted by the offset. Further, the generating the Hamming check between the frequency-domain input samples and a reference pattern may further include doing an input power measurement, and to perform the Hamming check when the input power is strong as seen to exceed a high minimum power threshold.

The generating the frame delimiter detection signal may further include generating a CFO estimate based in part on the angle of the polar formatted dot product. Also, the generating the frame delimiter detection signal may further include generating a fractional timing estimate of the frame timing based in part on the magnitude of the polar formatted dot product.

A frame delimiter detection system is also disclosed and includes a phase differentiator and buffering module, a phase-to-I/Q reformatting module, a dot product module, an I/Q-to-polar reformatting module, a dot product comparison module, and a frame delimiter detection module.

The phase differentiator and buffering module may be configured to receive a communication packet including phase domain input samples including a frame delimiter, and to convert the phase domain input samples corresponding to the frame delimiter into frequency domain input samples. The phase-to-I/Q reformatting module configured to reformat the frequency domain input samples into in-phase and quadrature-phase (I/Q) formatted frequency domain input samples. The dot product module may be configured to perform a dot product process between the I/Q formatted frequency domain input samples and a reference pattern indicative of an expected frame delimiter, and to generate an I/Q formatted dot product. The I/Q-to-polar reformatting module may be configured to reformat the I/Q formatted dot product into a polar formatted dot product including a magnitude of the polar formatted dot product and an angle of the polar formatted dot product. The dot product comparison module may be configured to generate a dot product sufficient signal when the magnitude of the dot product exceeds a dot product threshold. The frame delimiter detection module may be configured to generate a frame delimiter detection signal based on the dot product sufficient signal.

A method for frame delimiter detection is disclosed. The method may include receiving in-phase and quadrature-phase (I/Q) formatted frequency domain input samples configured as a frame delimiter in a communication packet. An I/Q formatted dot product may be generated from the I/Q formatted frequency domain input samples and a reference pattern indicative of an expected frame delimiter. Further, a frame delimiter detection signal may be generated based on a magnitude of the I/Q formatted dot product.

FIG. 1 illustrates a system 100 which may include a receiver 105 and other components, such as a transmitter (not shown). Receiver 105 couples to a processor 110. The processor 110 may be, for example, an ASIC or FPGA or a programmed general purpose processor or a programmed DSP. The receiver 105 includes, for example, a preamble detector 107, a demodulator 108, and a decoder 109 and may include other components (not shown). The preamble detector 107 is coupled to the demodulator 108, which is coupled to the decoder 109. The demodulator 108 may be, for example, a discriminator based demodulator.

The preamble detector 107 may be configured to perform frequency domain synchronization of packets according to the present disclosure. More specifically, the preamble detector 107 may be configured to employ frequency domain correlation, and classify correlation output as a valid preamble symbol or an invalid preamble pattern. The demodulator 108 may, for example, be configured to generate bit log-likelihood ratios (LLRs) for received samples. The decoder 109, which may, for example, be implemented as a Viterbi decoder, functions to decode received samples. It should be appreciated that components of the receiver 105 that are not deemed desirable for understanding the disclosed subject matter have been omitted for the sake of brevity.

Receiver 105 may be used in a low cost IoT network and may comply with one of one several standards relevant to IoT such as an IEEE 802.15.4 standard, or the Bluetooth Low Energy (BLE) standard. Receiver 105 may include front-end circuitry (not shown) such as mixers, oscillators, amplifiers, analog-to-digital converters (ADC), and filters. The received signal includes input samples that may be mixed with a local oscillator signal to produce in-phase (I) and quadrature (Q) components. The I and Q signals may then follow two paths, which are commonly illustrated as input samples 115. Receiver 105 may also include correction digital circuitry to correct analog impairments, such as I/Q imbalance correction or gain adjustments. Such circuits are known to those skilled in the art are not further described herein.

Figure 2:
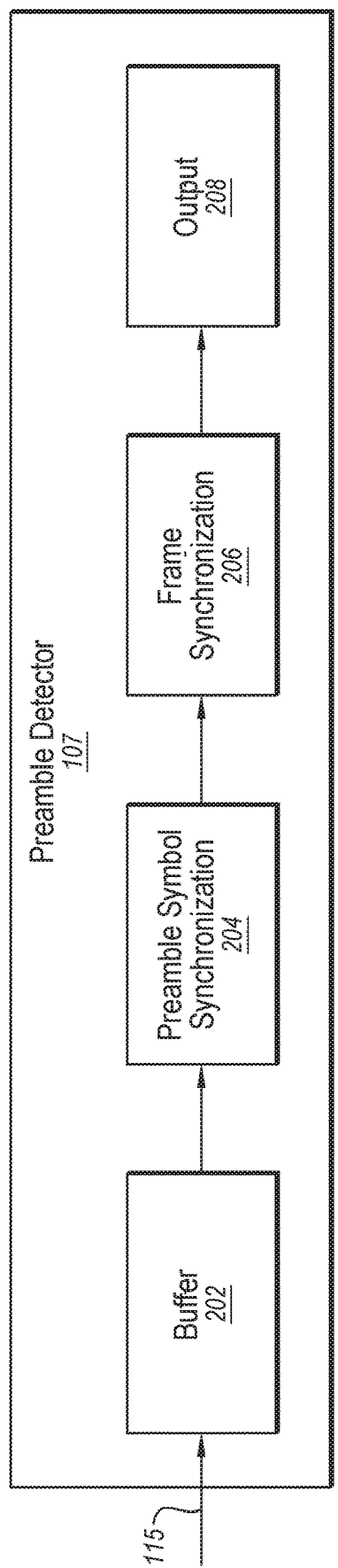
FIG. 2 illustrates a block diagram of a preamble detector, in accordance with embodiments described herein.

FIG. 2 illustrates exemplary components that may be employed in the preamble detector 107 of FIG. 1. As is shown, the preamble detector 107 includes a buffer module 202 (e.g., including one or more circular buffers) that stores samples of a received input samples. A symbol synchronization m 204 accesses samples from the buffer module 202 and performs operations on the samples to determine whether a valid preamble symbol can be detected. Upon preamble symbol detection, frame synchronization module 206 performs operations to determine whether a valid frame delimiter can be detected. When frame synchronization is achieved, output module 208 may assert various flags (e.g., a frame synchronization flag (FRAME_SYNC_FLAG)) and provide applicable frame timing information (e.g., in the form of a FRAME_TIMING signal).

The frame synchronization module 206 provides for frame synch delimiter detection for MSK/(G)FSK signals and is flexible in terms of handling up to very large modulation indexes and very long preamble sequences while keeping complexity low. The disclosed correlator is based on conversion from the FM domain to the I/Q domain and has an extension to handle large deviation modulations. The disclosed correlator requires passing an input power threshold and measures the Hamming distance of the received synch pattern if the incoming signal level is high enough. It also has the capability of fractional timing estimation and frequency offset estimation.

Figure 3:
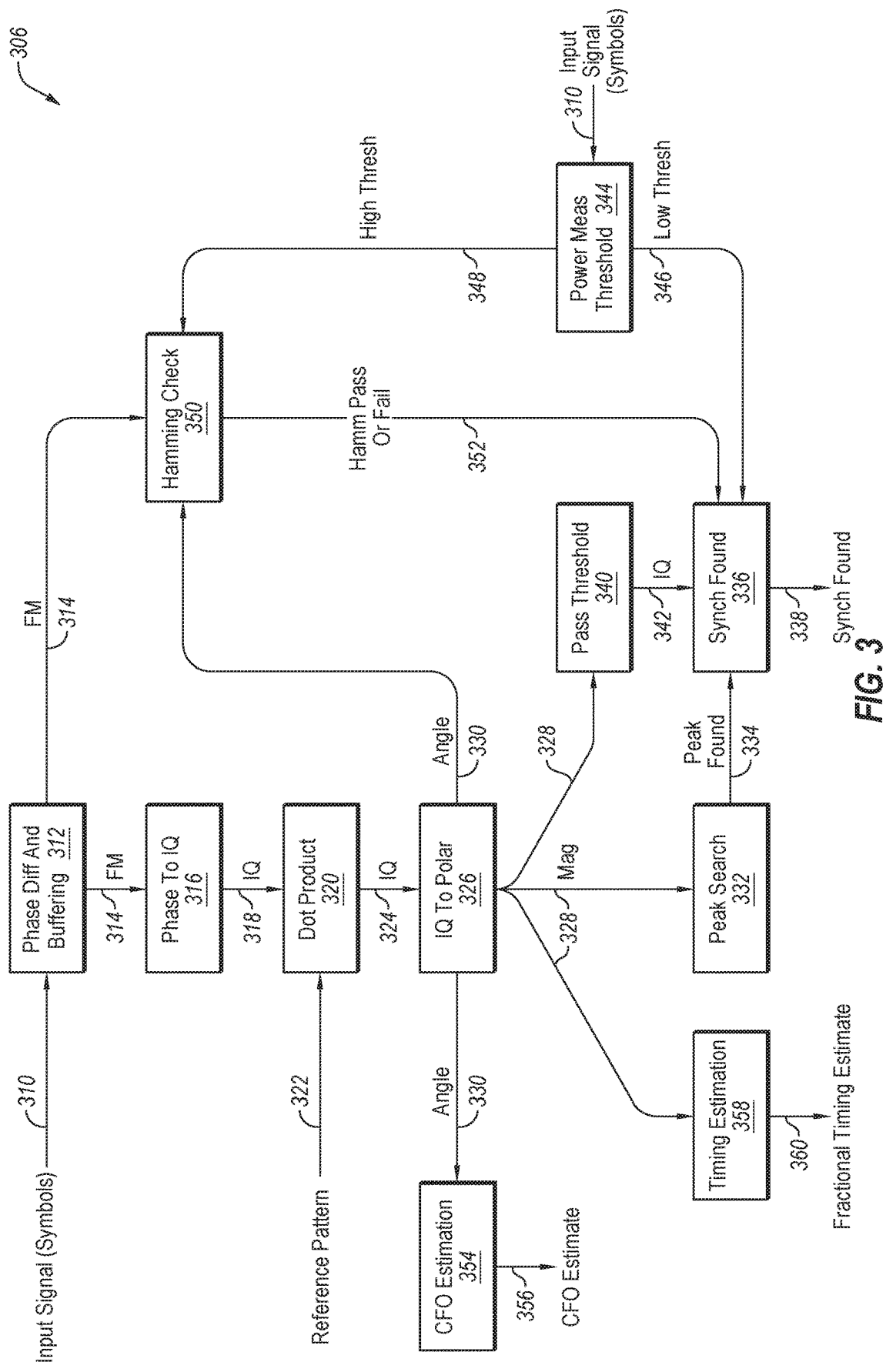
FIG. 3 illustrates a block diagram of a frame synchronization module, in accordance with embodiments described herein.

FIG. 3 illustrates a block diagram of the frame synchronization module 306, corresponding to the frame synchronization module 206 of FIG. 2. The frame synchronization module 306 receives a phase domain input samples 310. The phase domain input samples 310 represent in-phase (I) and quadrature phase (Q) signals that have been formed from a radio frequency (RF) signal received at antenna (not shown), split and provided to mixers (not shown), where the received input signal is mixed with a local oscillator signal to produce the in-phase (I) and quadrature (Q) components of the phase domain input samples 310 in the phase domain. The I and Q components may also be amplified (not shown), and converted to digital signals using analog-to-digital converters (not shown). Further, the I and Q components may be down-converted to baseband and provided as the phase domain input samples 310.

The frame synchronization module 306 further includes a phase differentiator and buffering module 312 configured to receive the phase domain input samples 310. The phase differentiator and buffering module 312 converts the phase domain input samples 310 into a frequency domain input samples 314. The conversion may be performed by differentiating the phase signal to result in a frequency signal.

The frame synchronization module 306 further includes a phase-to-I/Q reformatting module 316 configured to receive the frequency domain input samples 314 and generate an I/Q formatted frequency domain input samples 318 by changing the frequency domain input signal into a complex (i.e., real and imaginary) signal designated herein as the I/Q formatted frequency domain input samples 318.

The frame synchronization module 306 further includes a dot product module 320 configured to receive the I/Q formatted frequency domain input samples 318 and perform the dot product operation to generate an I/Q formatted dot product 324. The dot product module 320 performs the dot product operation using the I/Q formatted frequency domain input samples 318 and a reference pattern 322. It should be noted that the I/Q formatted frequency domain input samples 318 includes a plurality of values, but the resulting I/Q formatted dot product 324 is a scalar value.

The frame synchronization module 306 further includes an I/Q-to-polar reformatting module 326 which is configured to receive the I/Q formatted dot product 324 and convert the I/Q formatted dot product 324 into a polar value including a magnitude of the polar formatted dot product 328 and an angle of the polar formatted dot product 330.

The frame synchronization module 306 further includes a dot product magnitude peak identification module 332 configured to receive the magnitude of the polar formatted dot product 328 and perform a peak search operation to generate a peak-found signal 334. The dot product magnitude peak identification module 332 may perform a peak search operation by comparing a peak magnitude to a previous peak magnitude, and when the subsequent value increases, then the peak has not been reached. However, when the peak search operation results in a subsequent value decrease, then the previous value is designated as the peak and the peak-found signal 334 may be asserted.

The frame synchronization module 306 further includes a frame delimiter detection module 336 which receives the peak-found signal 334 and generates a frame delimiter detection signal 338. The frame delimiter detection signal 338 may also be known as a frame delimiter which identified a known synchronization pattern. In one embodiment, the frame delimiter detection signal 338 may be the peak-found signal 334. In other embodiments, the frame delimiter detection signal 338 may be generated based on further inputs as further described herein.

The frame synchronization module 306 may further include a dot product comparison module 340. The dot product comparison module 340 is configured to receive the magnitude of the polar formatted dot product 328 and generates a dot product sufficient signal 342 indicative of the magnitude of the polar formatted dot product 328 exceeding a magnitude threshold value. In another embodiment, the dot product sufficient signal 342 may be combined, at the frame delimiter detection module 336, with other signals, such as the peak-found signal 334 to generate the frame delimiter detection signal 338.

The frame synchronization module 306 may further include an input power measurement module 344 configured to measure an I/Q domain input signal 311 against high and low thresholds. The phase domain input signal 311 may be the same signal as the phase domain input samples 310. The input power measurement module 344 may generate an input power sufficient signal 346 for use by the frame delimiter detection module 336 to use in combination with other signals for the generation of the frame delimiter detection signal 338. The input power measurement module 344 may generate an input power strong signal 348

The frame synchronization module 306 may further include a Hamming check module 350 configured to receive the frequency domain input samples 314, the angle of the polar formatted dot product 330, and the input power strong signal 348, and generate a Hamming check match signal 352. In another embodiment, the Hamming check match signal 352 may be used with other signals for the generation of the frame delimiter detection signal 338 by the frame delimiter detection module 336.

The frame synchronization module 306 may further include a carrier frequency offset (CFO) estimation module 354 configured to receive the angle of the polar formatted dot product 330 and generate a CFO estimate 356. Further, a timing estimation module 358 may be configured to generate a fractional timing estimate 360 of the communication packet based in part on the magnitude of the polar formatted dot product.

Figure 4:
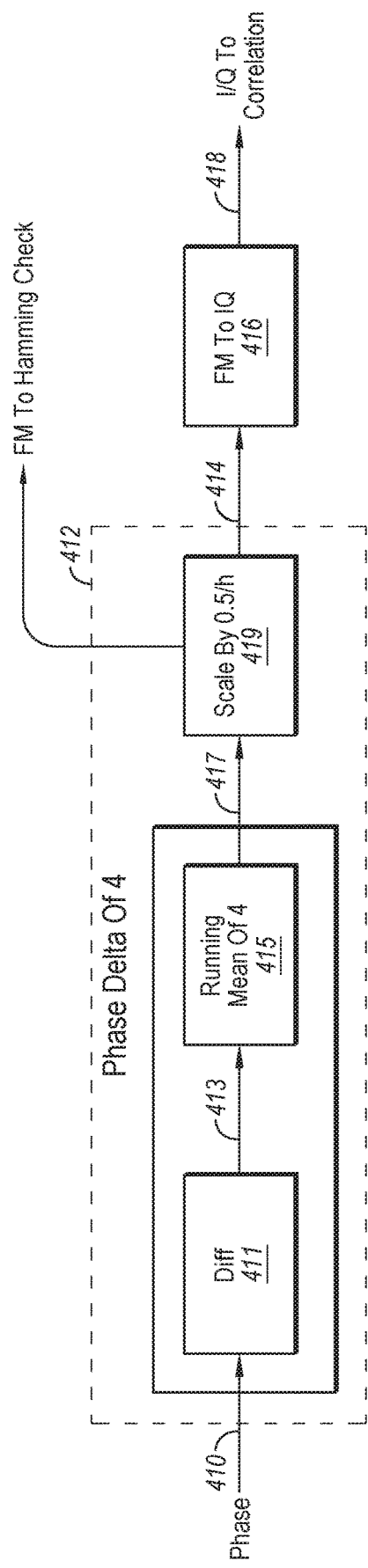
FIG. 4 illustrates a block diagram of a phase differentiator and buffering module, in accordance with embodiments described herein.

FIG. 4 illustrates a more detailed diagram of a phase differentiator and buffering module 412 and FM to I/Q module 416. The input signal 410 and a phase differentiation process and buffering is performed in the phase differentiator and buffering module 412. The input signal 410 includes, for example, four samples of data per symbol. The phase differentiator and buffering module 412 includes a differentiator 411 and running mean module 415. Specifically, the differentiator 411 performs sample differentiation by monitoring for incrementing and decrementing phases of the input signal. Further, the running mean module 415 continues to integrate the phase differences to form a result signal 417. The result signal 417 identifies the amount of phase change over four samples which corresponds to the number of samples, for example, in a symbol. The result signal 417 may them be scaled by a scaling module 419 to generate a scaled result signal 414. An FM-to-I/Q module 416 receives the scaled result signal 414 and converts the scaled result signal to an I/Q signal 418 by identifying a point in a constellation that corresponds to the angle of the symbol with a default magnitude of a unit vector or one.

Figure 5:
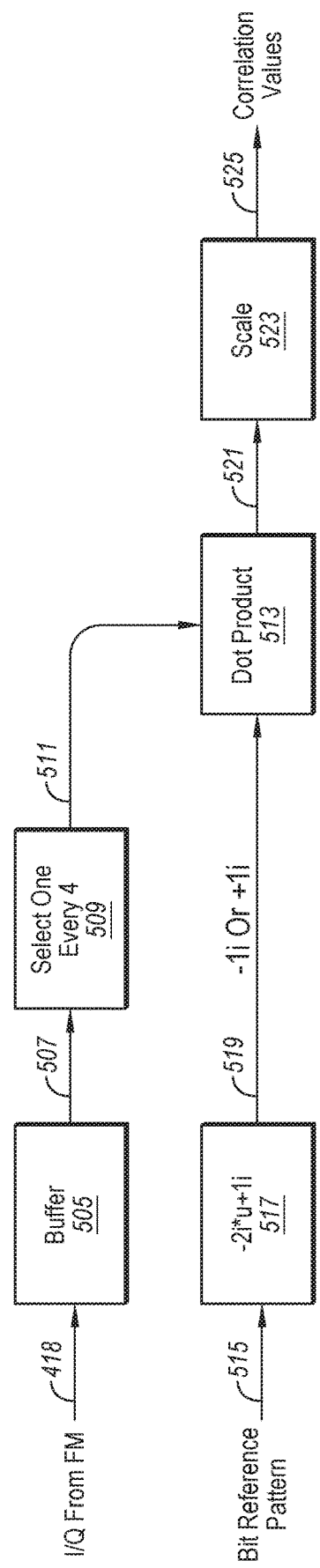
FIG. 5 illustrates a block diagram of a dot product process, in accordance with embodiments described herein.

FIG. 5 illustrates a more detailed diagram of the correlation of the input signal with reference values. The I/Q signal 418 is received and buffered by buffer module 505 which generates buffered I/Q signals 507. The buffer module 505 buffers, for example, 32 samples, where one of every four samples is used for performing the dot product operation with the reference signals. The buffered I/Q signals 507 are received at a down-select module 509 which forwards, for example, one of every four samples as down selected samples 511 to a dot product module 513. The dot product module 513 also receives a rotated reference signal 519 formed from a reference signal 515 that is subjected to a rotation module 517. The dot product module 513 then forms a dot product signal 521 from the down selected samples 511 and the rotated reference signal 519. The dot product signal 521 may be scaled by scaling module 523 to form a correlation value 525. The dot product operation matches the input signal with the reference pattern. Generally, the reference pattern is phase pattern, however, in the disclosed embodiment, a frequency reference pattern is compared to a frequency signal.

Figure 6:
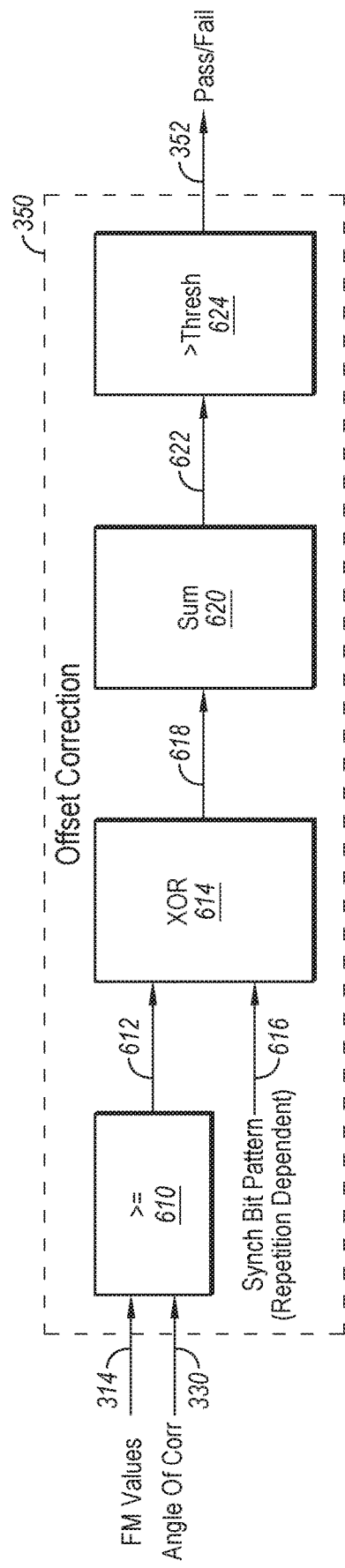
FIG. 6 illustrates a block diagram of a Hamming check module, in accordance with embodiments described herein.

FIG. 6 illustrates a more detailed diagram of the Hamming check module 350 of FIG. 3. Generally, the frequency domain input samples 314 couples to an offset correction module 610 and is offset corrected by the angle of the polar formatted dot product 330 to generate an offset corrected frequency domain input signal 612. The Hamming check module 350 further includes a pattern comparison module 614 for comparing the offset corrected frequency domain input signal 612 with a Hamming pattern signal 616 and generating a Hamming comparison result signal 618 that is accumulated by summing module 620 and generates a summing result 622. The summing result 622 is compared against a threshold value in a threshold comparison module 624 and generates the Hamming check match signal 352 of FIG. 3. Using the Hamming check module 350 enables a fast method for determining if the received input signal is correct because comparisons rather than computations provide the result. Furthermore, some communication standards require a Hamming check result.

Figure 7:
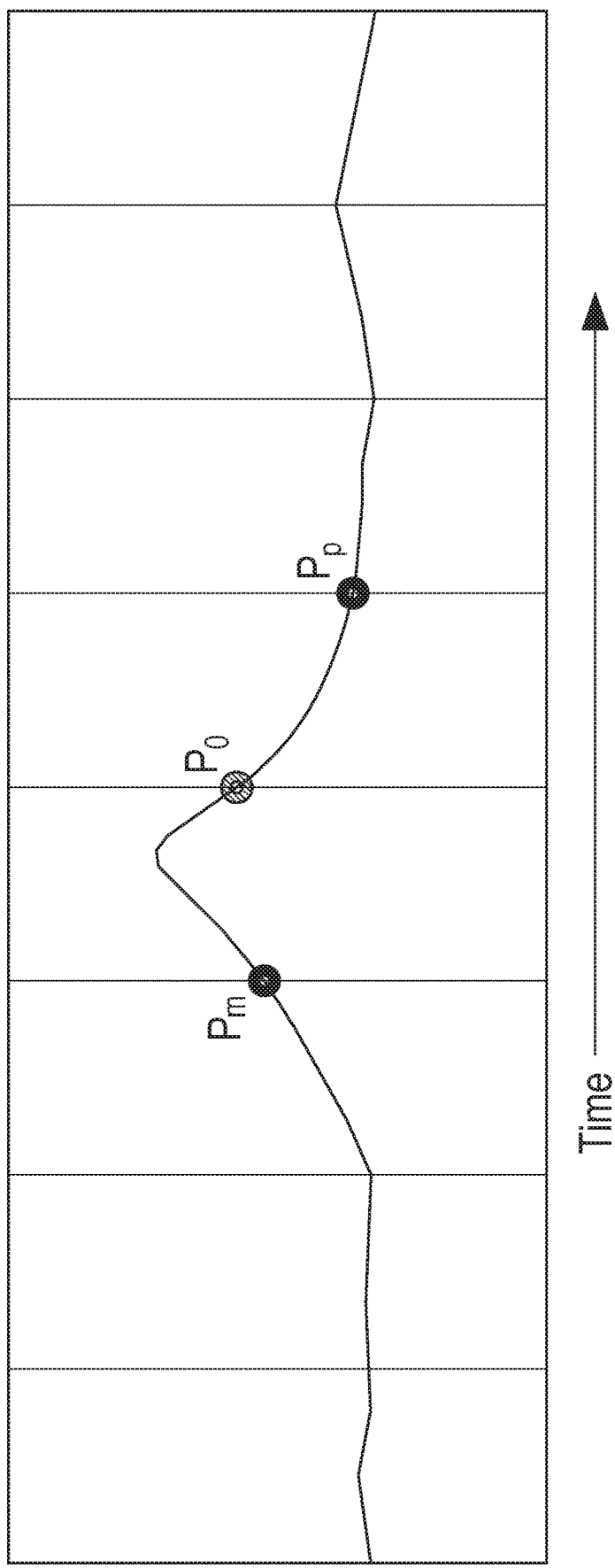
FIG. 7 illustrates an example waveform illustrating a peak search process for a dot product magnitude peak identification module, in accordance with embodiments described herein.

FIG. 7 illustrates a carrier frequency estimation process. A peak correlation value is shown a $P_0$ with adjacent values shown as $P_m$ and $P_p$, with $P_m$ occurring prior in time to $P_0$ and $P_p$ occurring later in time to $P_0$. The timing estimate may be obtained by subtracting the values $P_m$–$P_p$ and multiplying by an empirically estimated constant. The frequency estimate may be obtained by taking the angle corresponding to the peak value P and multiplying it by the modulation index, an example of which is ½ for BLE applications.

Figure 8:
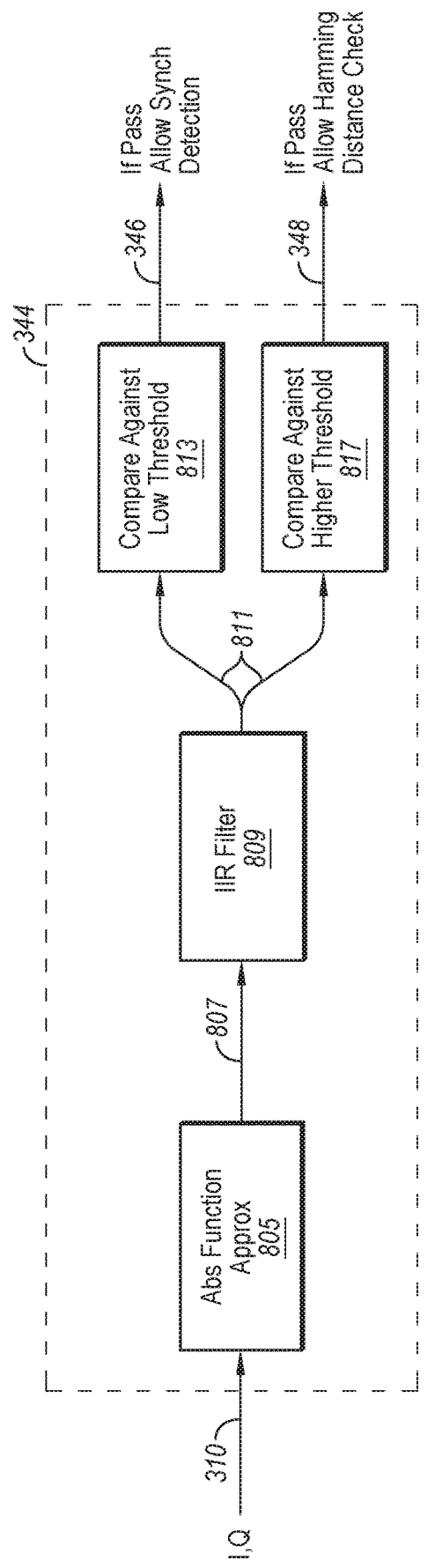
FIG. 8 illustrates a block diagram of an input power measurement module, in accordance with embodiments described herein.

FIG. 8 illustrates a more detailed diagram of the input power measurement module 344 of FIG. 3. The input power measurement module 344 includes three cascaded modules applied to the baseband signal or the phase domain input samples 310. The input power measurement module 344 receives the I/Q domain input samples 310 at an absolute function approximation module 805 and generates an absolute value signal 807. The absolute function may be approximated by the following equation:

$$abs \sim = \tfrac{3}{8}*\min(|I|,|Q|)+\max(|I|,|Q|)$$

The absolute value signal 807 is received at an IIR filter 809 where an output 811 is generated to a low threshold comparison module 813 to generate the input power sufficient signal 346 and the input power strong signal 348. The IIR filter may be represented by the following equation:

$$H(z)=2^{-n}/(1-(1-2^{-n})z^{-1})$$

Also, when the input power sufficient signal 346 is asserted, then synch detection is enabled. The absolute value signal 807 received at the IIR filter 809 where the output 811 is generated to a high threshold comparison module 817 to generate the input power strong signal 348. Also, when the input power strong signal 348 is asserted, then allow the Hamming check module 350 to perform the Hamming distance check.

Figure 9:
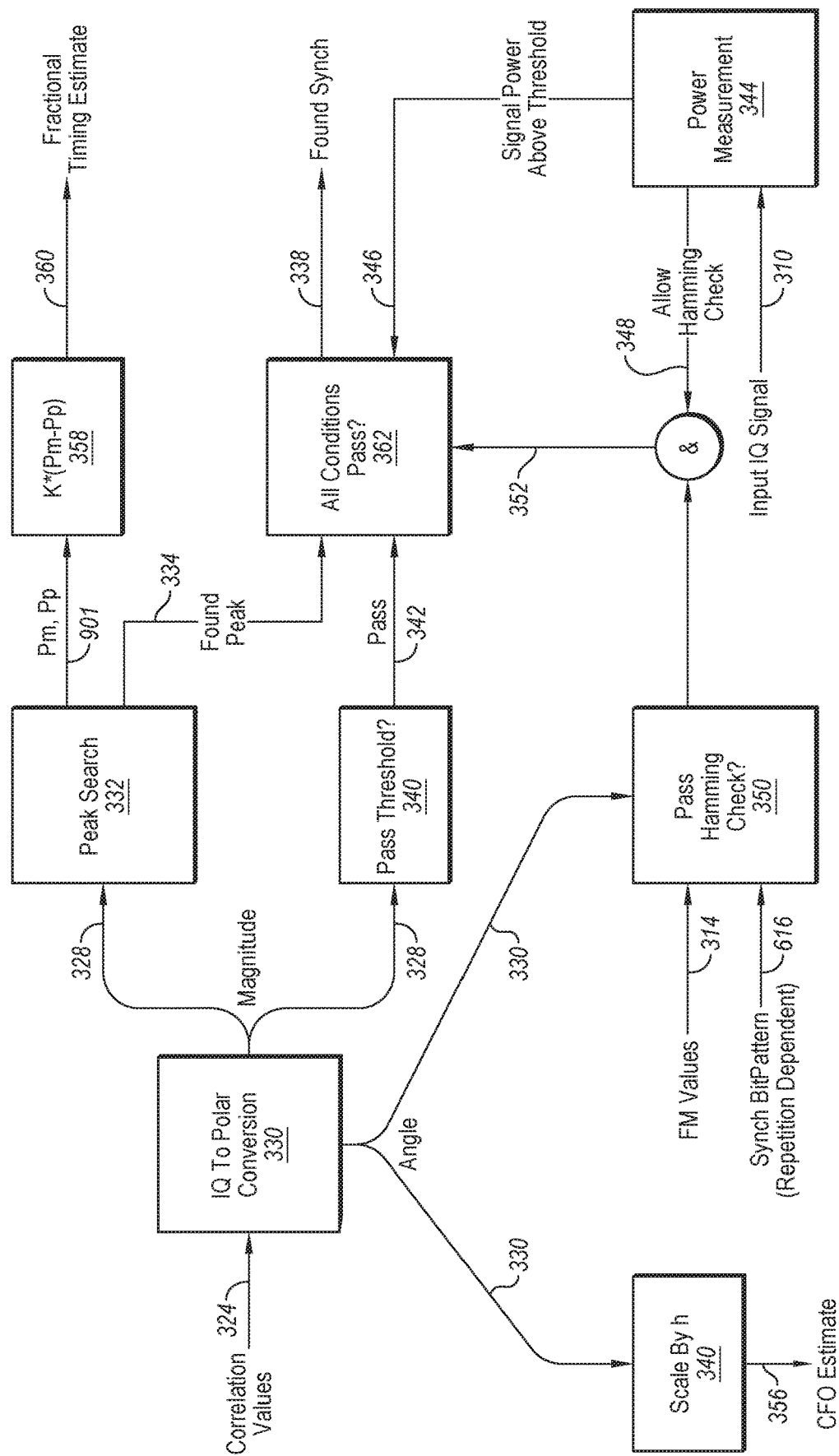
FIG. 9 illustrates a flow diagram for generating a frame delimiter detection signal, a carrier frequency offset signal, and fractional timing estimates, in accordance with embodiments described herein.

FIG. 9 illustrates a more detailed flow diagram following the dot product result of FIG. 3. The I/Q formatted dot product 324 is an I/Q value received at the I/Q-to-polar conversion module 326. FIG. 9 illustrates the several conditions are met at the frame delimiter detection module 336 in order to declare the frame delimiter detection signal 338. Specifically, an input power sufficient signal 346 is generated from detecting at the input power measurement module 344 that the phase domain input I/Q samples 310 have a power greater than a minimum threshold value. Also, the frame delimiter detection signal 338 is a product of identification of a peak-found signal 334 representing the peak correlation value. Further, the frame delimiter detection signal 338 is also a product of generation of the Hamming check match signal 352. Yet further, the frame delimiter detection signal 338 is a product of the correlation signal passing a threshold as represented by a dot product sufficient signal 342.

It is noted that the Hamming check may be defeated when the signal power is near sensitivity, as the Hamming check requires a minimum signal level as illustrated by a dot product sufficient signal 342.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Values such as maximum or minimum may be predetermined and set to different values based on the application.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A method, comprising:
   receiving a communication packet including phase domain input samples including a frame delimiter;
   converting the phase domain input samples corresponding to the frame delimiter into frequency domain input samples;
   reformatting the frequency domain input samples into in-phase and quadrature-phase (I/Q) formatted frequency domain input samples;
   performing a dot product process between the I/Q formatted frequency domain input samples and a reference pattern indicative of an expected frame delimiter and to generate an I/Q formatted dot product;
   reformatting the I/Q formatted dot product into a polar formatted dot product including a magnitude of the polar formatted dot product and an angle of the polar formatted dot product;
   generating a dot product sufficient signal when the magnitude of the dot product exceeds a dot product threshold; and
   generating a frame delimiter detection signal based on the dot product sufficient signal.

2. The method of claim 1, wherein the generating the frame delimiter detection signal further comprises:
   identifying a peak in the magnitude of the polar formatted dot product;
   generating a peak-found signal in response to the identifying the peak; and
   generating the frame delimiter detection signal based in part on the peak-found signal.

3. The method of claim 1, wherein the generating the frame delimiter detection signal further comprises:
   asserting an input power sufficient signal based on a comparison of a power level of the phase domain input samples with a lower power threshold; and
   when the input power sufficient signal is asserted, generating the frame delimiter detection signal based in part on the input power sufficient signal.

4. The method of claim 1, wherein the generating the frame delimiter detection signal further comprises:
   generating a Hamming check match signal based on a Hamming check between the frequency-domain input samples and a Hamming reference pattern; and
   when the Hamming check match signal indicates passing the Hamming check, generating the frame delimiter detection signal based in part on the Hamming check match signal.

5. The method of claim 4, wherein the generating the Hamming check match signal further comprises:
   adjusting an offset of the frequency domain input samples based on the angle of the polar formatted dot product, and to perform the Hamming check based on the frequency domain input samples adjusted by the offset.

6. The method of claim 4, wherein the generating the Hamming check match signal further comprises:
   receiving an input power strong signal, and to perform the Hamming check when the input power strong signal is measured to exceed a high threshold.

7. The method of claim 1, further comprising:
   generating a carrier frequency offset (CFO) estimate based in part on the angle of the polar formatted dot product.

8. The method of claim 1, further comprising:
   generating a fractional timing estimate of the communication packet based in part on the magnitude of the polar formatted dot product.

9. A frame delimiter detection system, comprising:
   a phase differentiator and buffering module configured to receive a communication packet including phase domain input samples including a frame delimiter, and to convert the phase domain input samples corresponding to the frame delimiter into frequency domain input samples;
   a phase-to-I/Q reformatting module configured to reformat the frequency domain input samples into in-phase and quadrature-phase (I/Q) formatted frequency domain input samples;
   a dot product module configured to perform a dot product process between the I/Q formatted frequency domain input samples and a reference pattern indicative of an expected frame delimiter, and to generate an I/Q formatted dot product;
   an I/Q-to-polar reformatting module configured to reformat the I/Q formatted dot product into a polar formatted dot product including a magnitude of the polar formatted dot product and an angle of the polar formatted dot product;
   a dot product comparison module configured to generate a dot product sufficient signal when the magnitude of the dot product exceeds a dot product threshold; and
   a frame delimiter detection module configured to generate a frame delimiter detection signal based on the dot product sufficient signal.

10. The system of claim 9, further comprising:
    a dot product magnitude peak identification module configured to identify a peak in the magnitude of the polar formatted dot product, and to generate a peak-found signal when the peak is identified; and
    the frame delimiter detection module further configured to generate the frame delimiter detection signal based in part on the peak-found signal.

11. The system of claim 9, further comprising:
    an input power measurement module configured to assert an input power sufficient signal based on a comparison of a power level of the I/Q input samples with a lower power threshold; and
    when the input power sufficient signal is asserted, the frame delimiter detection module further configured to generate the frame delimiter detection signal based in part on the input power sufficient signal.

12. The system of claim 9, further comprising:
    a Hamming check module configured to generate a Hamming check match signal based on a Hamming check between the frequency-domain input samples and a Hamming reference pattern; and when the Hamming check match signal indicates passing the Hamming check, the frame delimiter detection module further configured to generate the frame delimiter detection signal based in part on the Hamming check match signal.

13. The system of claim 12, wherein the Hamming check module is further configured to:

adjust an offset of the frequency domain input samples based on the angle of the polar formatted dot product, and to perform the Hamming check based on the frequency domain input samples adjusted by the offset.

14. The system of claim 12, wherein the Hamming check module is further configured to receive an input power strong signal, and to perform the Hamming check when the input power strong signal is measured to exceed a high threshold.

15. The system of claim 9, further comprising:

a carrier frequency offset (CFO) estimation module configured to generate a CFO estimate based in part on the angle of the polar formatted dot product.

16. The system of claim 9, further comprising:

a timing estimation module configured to generate a fractional timing estimate of the communication packet based in part on the magnitude of the polar formatted dot product.

17. A method, comprising:

receiving in-phase and quadrature-phase (I/Q) formatted frequency domain input samples configured as a frame delimiter in a communication packet;

generating an I/Q formatted dot product from the I/Q formatted frequency domain input samples and a reference pattern indicative of an expected frame delimiter; and generating a frame delimiter detection signal based on a magnitude of the I/Q formatted dot product.

18. The method of claim 17, wherein the frame delimiter detection signal is further based on one or more of a peak in the magnitude of the I/Q formatted dot product, and a comparison of a power level of the frame delimiter in the communication packet.

19. The method of claim 17, wherein the frame delimiter detection signal is further based on passing a Hamming check between the frame delimiter in the communication packet and a Hamming reference pattern.

20. The method of claim 17, further comprising:

generating a carrier frequency offset (CFO) estimate based in part on an angle of the I/Q formatted dot product.

* * * * *